US012488700B2

(12) United States Patent
Yeung

(10) Patent No.: US 12,488,700 B2
(45) Date of Patent: Dec. 2, 2025

(54) LEARNING COACHING APPARATUS AND SYSTEM

(71) Applicant: The Education University of Hong Kong, Tai Po (HK)

(72) Inventor: Siu Sze Yeung, Tai Po (HK)

(73) Assignee: The Education University of Hong Kong, Tai Po (HK)

( * ) Notice: Subject to any disclaimer, the term of this patent is extended or adjusted under 35 U.S.C. 154(b) by 0 days.

(21) Appl. No.: 18/428,479

(22) Filed: Jan. 31, 2024

(65) Prior Publication Data

US 2025/0246088 A1 Jul. 31, 2025

(51) Int. Cl.
*G09B 5/06* (2006.01)

(52) U.S. Cl.
CPC ................................ *G09B 5/06* (2013.01)

(58) Field of Classification Search
CPC ................................................. G09B 5/06
See application file for complete search history.

(56) References Cited

U.S. PATENT DOCUMENTS

| | | | | |
|---|---|---|---|---|
| 2008/0280269 | A1* | 11/2008 | Yeung | G09B 19/04 434/157 |
| 2017/0337186 | A1* | 11/2017 | Zhang | H04L 67/52 |
| 2022/0176565 | A1* | 6/2022 | Munich | G06F 40/56 |

* cited by examiner

*Primary Examiner* — Kesha Frisby
(74) *Attorney, Agent, or Firm* — Renner, Kenner, Greive, Bobak, Taylor & Weber

(57) ABSTRACT

A language coaching apparatus includes a chassis, one or more sensors disposed on or within the chassis, wherein the one or more sensors are configured to record an audible recitation by a user, a user interface disposed on the chassis, wherein the user interface is configured to present one or more words on the user interface, wherein the language coaching apparatus is configured to interact audibly and/or visually with the user to assist with learning a language.

15 Claims, 15 Drawing Sheets

LEARNING COACHING APPARATUS AND SYSTEM

TECHNICAL FIELD

The present invention relates to a language coaching apparatus and system. In particular, the present invention relates to a language coaching apparatus and system that is adapted to facilitate language learning in children.

BACKGROUND

Learning a new language can be quite challenging for users, especially children. Language learning often requires a lot of one-on-one attention from teachers. Teachers have to provide a lot of feedback to users. It can be difficult for teachers to provide adequate attention to each user e.g., each student and it can be difficult for teachers to score or evaluate the performance of each student. Additionally, students learn best when they are given live feedback. This can be challenging for teachers to provide feedback.

SUMMARY OF THE INVENTION

In accordance with a first aspect, there is provided a language coaching apparatus comprising:
a chassis,
one or more sensors disposed on or within the chassis, wherein the one or more sensors are configured to record an audible recitation by a user,
a user interface disposed on the chassis, wherein the user interface is configured to present one or more words on the user interface,
wherein the language coaching apparatus is configured to interact audibly and/or visually with the user to assist with learning a language.

In one example the language coaching apparatus is configured to:
present one or more words of a language on the user interface for audible recitation by a user,
sense an audible recitation of the one or more words of the language presented on the user interface,
evaluate the audible recitation,
generate a score of the audible recitation, wherein the score represents the quality of the audible recitation, and;
provide feedback to the user to improve their audible recitation and/or facilitate learning of the language.

In one example the feedback is provided via the user interface, and wherein the feedback may comprise audible and/or visual feedback
the feedback comprises one or more of: suggested improvements a user can make to their audible recitation or a correct pronunciation of the one or more words in the language, and;
wherein the one or more words presented on the user interface are a phrase, sentence or a story.

In one example the feedback comprises suggested improvements to one or more of: pronunciation, integrity of the recitation, fluency of the recitation, sentence structure, or an overall quality of the recitation.

In one example the feedback is generated based on the score of the audible recitation and wherein the apparatus is configured to present more complex words or phrases or sentences as the user's score improves to facilitate learning of the language.

In one example the language coaching apparatus comprising:
one or more moveable arms,
a speaker,
wherein the one or more sensors comprise:
a camera, wherein the camera is configured to record gestures and/or facial expressions of the user while performing the audible recitation,
a microphone, wherein the microphone is configured to record the audible recitation by the user,
wherein the user interface comprises:
a first screen
a second screen, wherein the second screen is larger than the first screen and the first screen is located above and spaced away from the second screen,
the first screen configured to present thereon a face,
the second screen configured to present thereon the one or more words for recitation,
wherein the controller is operatively coupled to the first screen, second screen, the camera, microphone, speaker and the one or more moveable arms, and;
wherein the language coaching apparatus is configured to:
present one or more facial expressions on the first screen, and;
move the one or more moveable arms to perform one or more gestures.

In one example the face presented on the first screen is a digital face including at least a mouth and two eyes,
the controller is configured to control the face on the first screen to illustrate one or more facial expressions, and;
wherein the facial expressions correspond to one or more human emotions.

The facial expressions presented may be human emotions and human facial expressions. Preferably the face presented on the first screen may include two eyes and a mouth. In a further example, the face presented on the first screen may include eyes, eyebrows, a nose and a mouth.

In one example the facial expressions displayed on the first screen correspond to the feedback. The facial expressions presented may be digital expressions presented on the user interface, in particular on the first screen.

In one example the language coaching apparatus is configured to:
interact with the user, wherein interaction with the user demonstrates one or more social skills,
wherein the social skills demonstrated may comprise one or more facial expressions presented on the first screen, gestures made by the one or more arms and tone in audible communications via the speaker, and;
wherein the interactions demonstrating social skills teach a user how to use social skills.

In one example the language coaching apparatus is configured to:
receive a story or access a prestored story,
recite the story in a multi sensory manner using facial expressions, gestures and/or audible tone to teach a user how to recite the story.

The coaching apparatus may further be configured to control one or more moveable arms to perform physical gestures to provide a multi sensory experience for a user.

The story may be accessed from a content management system. The content management system may be a remote system e.g., a cloud based system. The language coaching apparatus may be configured to communicate with the content management system and access a story. A teacher or other authorized person may create stories via the content management system and transmit them to the language coaching apparatus. Alternatively, or in addition the language coaching apparatus may be configured to communicate with and access stories (e.g., audiobooks) from one or more virtual libraries e.g., an online portal of a community library.

In one example the language coaching apparatus is configured to operate in co-tell mode, wherein in co-tell mode the language coaching apparatus is configured to audibly recite the one or more words in conjunction with a user to teach the user how to recite the one or more words in the language.

In one example the language coaching apparatus is configured to operate in listen mode, wherein in listen mode the language coaching apparatus is configured to perform the steps of claim 2 during listen mode.

In one example the language coaching apparatus is configured to operate in a re-tell mode, wherein in re-tell mode the language coaching apparatus is configured to:
prompt a user to recite the presented one or more words,
provide hints or guiding questions to assist the user in reciting the one or more words correctly,
provide an audible recitation of the correct recitation of the one or more words. The apparatus may audibly recite the words with the correct pronunciation to assist a user.

In one example the language coaching apparatus is configured to:
determine a user's needs based on the score of the user,
adjust the linguistic requirements or linguistic features of the one or more words based on the user's needs.

In one example, an authorized person e.g., a teacher may upload a user's needs via the content management system or via a portable memory unit e.g., a USB etc. The user's needs may be stored in a controller or a memory unit of a controller, of the language coaching apparatus.

In one example the language coaching apparatus is configured to:
operate in a listen mode first,
operate in one of co-tell mode or re-tell mode or, operate in co-tell mode and then operate in re-tell mode,
evaluate the audible recitation in each mode,
score the audible evaluation in each mode.

In one example the language coaching apparatus is configured to apply a scoring model to score the audible recitation, wherein the scoring model is configured to score the quality the audible recitation by comparing the audible recitation with a reference recitation.

In one example the scoring model is configured to:
decompose the audible recitation into phonemes,
compare the decomposed phonemes from the audible recitation with reference phonemes,
generate a score based on the correlation of the decomposed phonemes to the reference phonemes.

The language coaching apparatus may be configured to receive the audible recitation e.g., via a microphone and decompose the recorded audio into phonemes. The apparatus may be configured to store a corpus of reference phonemes. The corpus may be created by collecting correct pronunciations of words, phrases and/or sentences from one or more experts in a language.

In one example the language coaching apparatus is configured to:
generate three sub scores,
wherein the first sub score corresponds to a score of pronunciation of each word in the recitation,
wherein a second sub score corresponds to a score integrity of recitation,
wherein a third sub score corresponds to a score of fluency the recitation, each sub score is between 1 and 4.

In one example the score is an overall score, and the apparatus is configured to generate the overall score based on combining or summing the sub scores.

In one example the language coaching apparatus is configured to:
receive a story from a remote system,
display the received story on the second screen,
generate one or more images based on the words in the received story,
display the images on the second screen during co-tell mode and re-tell mode as prompts for the user.

A language coaching system comprising:
a language coaching apparatus as described in any one or more statements above, and;
a remote content management system in communication with the language coaching apparatus.

The remote content management system configured to allow an authorized user to create one or more words (e.g., stories or phrases or sentences etc.) for recitation, and the content management system configured to transmit the one or more words to the language coaching apparatus.

The remote content management system may be configured to allow an authorize person to create or input a story, select one or more AI generated images related to the story and input appropriate questions related to the story. The questions may be guiding questions to assist and guide a user reading the story.

The term "comprising" (and its grammatical variations) as used herein are used in the inclusive sense of "having" or "including" and not in the sense of "consisting only of".

It is to be understood that, if any prior art information is referred to herein, such reference does not constitute an admission that the information forms a part of the common general knowledge in the art.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The present invention relates to a language coaching apparatus that is adapted to assist children in learning a language. The language coaching apparatus is configured to interact with users (e.g., children) to assist user's in learning a language or improve spoken language.

The present invention relates to a language coaching apparatus comprising: a chassis, one or more sensors disposed on or within the chassis, wherein the one or more sensors are configured to record an audible recitation by a user, a user interface disposed on the chassis, wherein the user interface is configured to present one or more words on the user interface, wherein the language coaching apparatus is configured to interact audibly and/or visually with the user to assist with learning a language.

The language coaching apparatus may be an autonomous or semi-autonomous device that is configured to interact with a user to assist the user to learn a language. The language coaching apparatus may assist users with reciting words, phrases, sentences correctly and accurately. The apparatus interacts with users to teach them how to correct pronounce words, phrases and sentences. The language coaching apparatus may be used as a teaching tool, to teach (i.e., coach) a user with learning a new language. The language coaching apparatus is particularly suited for coaching children who are trying to learn a language.

Figure 1:
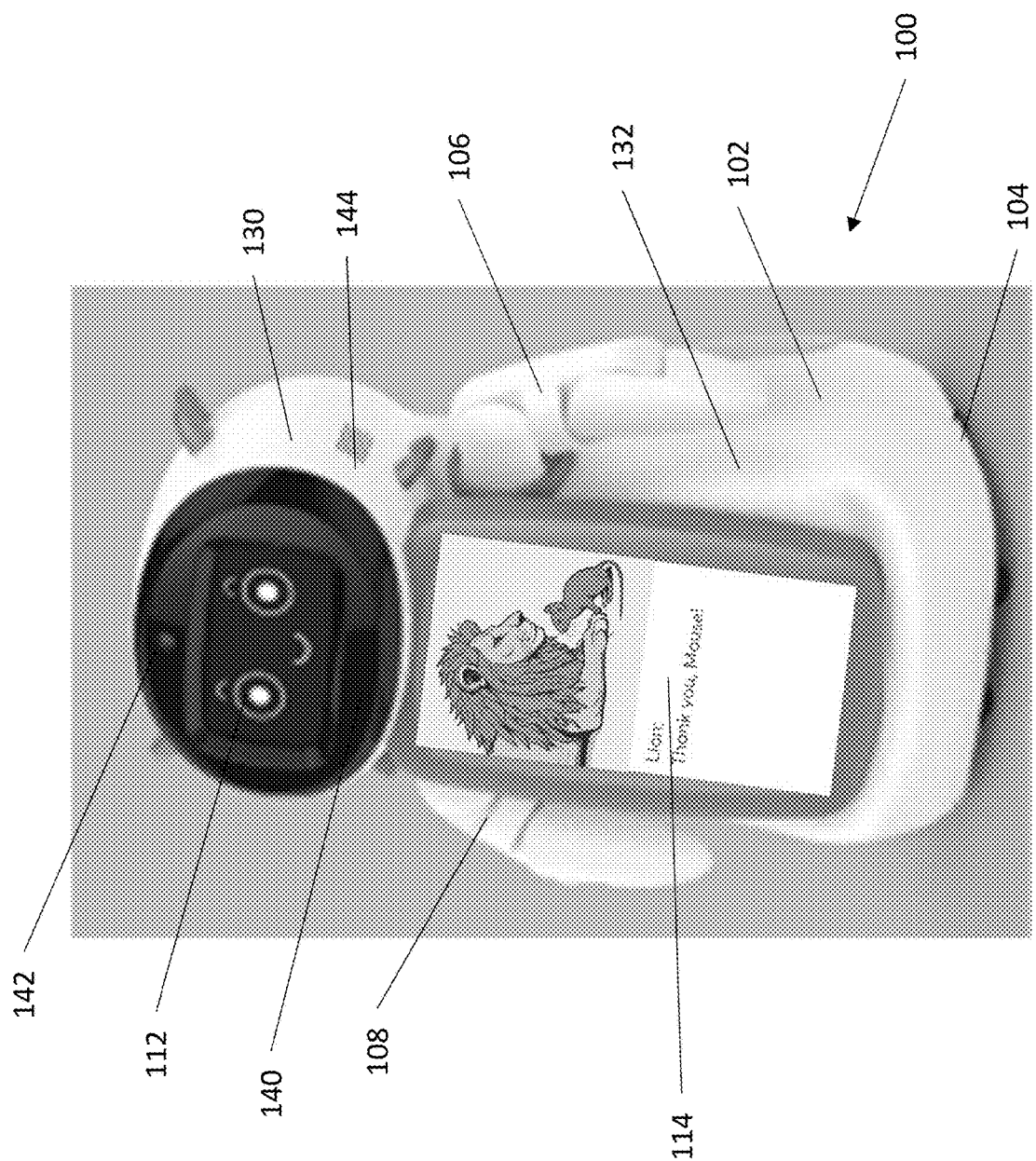
FIG. 1 illustrates an example embodiment of a language coaching apparatus.

Referring to FIG. 1, an example embodiment of the language coaching apparatus 100 is illustrated. The language coaching apparatus 100 comprises a chassis 102 or body. The apparatus 100 further comprises a locomotion assembly 104 and a pair of moveable arms 106, 108 disposed on the chassis 102. The apparatus 100 further comprises one or more sensors located on or within the chassis 102, and a user interface 110 disposed on the chassis 102. The language coaching apparatus 100 further comprises a controller 200 that is operatively connected to the user interface 110, moveable arms 106, 108 and the locomotion assembly 104. The apparatus 100 further comprises a power source 120. The power source 120 may be a battery or other portable power source. The apparatus 100 may further be configured to connect to wall socket and operate off mains power.

In one example the language coaching apparatus is configured to: present one or more words of a language on the user interface for audible recitation by a user. In use, the user interface 110 is configured to present one or more words to a user. The one or more words may be a word, phrase, sentence or a story. The user is encouraged to read the one or more words aloud, i.e., the user is prompted to perform an audible recitation.

The coaching apparatus is further configured to: sense an audible recitation of the one or more words of the language presented on the user interface, via the one or more sensors. The coaching apparatus is further configured to evaluate the audible recitation and generate a score of the audible recitation. The score may represent the quality of the audible recitation. The coaching apparatus 100 is configured to provide feedback to the user to improve their audible recitation and/or facilitate learning of the language. The feedback may be presented via the user interface. The feedback may be audible feedback or visual feedback or a combination of audible and visual feedback.

In one example the feedback comprises one or more of: suggested improvements a user can make to their audible recitation or a correct pronunciation of the one or more words in the language. The one or more words presented on the user interface are a phrase, sentence or a story.

In the illustrated example of FIG. 1, the locomotion assembly 104 may comprise a plurality of wheels. The wheels may be controlled by the controller 200. The apparatus 100 may be an automated guided vehicle that is capable of automatically being driven from point to point. The apparatus 100 may be controlled to travel from point to point or along a path. The travel path or the points to travel between may be programmed and stored in the controller.

The one or more sensors may comprise sensors that are capable of sensing obstacles. For example, the apparatus may comprise Lidar sensor for obstacle detection. In another example, the apparatus 100 may include a camera to record video or capture images in front of the apparatus. Optionally, the apparatus 100 may further comprise limit switches or ultrasonic sensors or other sensors to be used with Lidar or the camera for obstacle detection.

The controller 200 may be programmed to perform obstacle avoidance. The language coaching apparatus 100 may also include a navigation system e.g., a GPS system or similar, to allow the apparatus to automatically move between points or along a path. A user may input a specific path or location via the user interface, and the controller 200 may be configured to control the locomotion assembly 104 to move the apparatus 100.

In the illustrated embodiment the language coaching apparatus 100 may be humanoid in shape and structure. The apparatus 100 comprises a head 130 mounted on a body 132. The wheels (i.e., locomotion assembly) may be mounted on an underside of the body 132. The chassis 102 may comprise the head and body. As shown in FIG. 1, the coaching apparatus 100 is a humanoid robot. The coaching apparatus 100 comprises rounded and smooth surfaces. The language coaching robot may be shaped and structured to have a chubby and cute appearance. Such an appearance makes the coaching apparatus 100 more engaging and relatable to children. The coaching apparatus 100 may comprise a bright and pastel color scheme.

Figure 2:
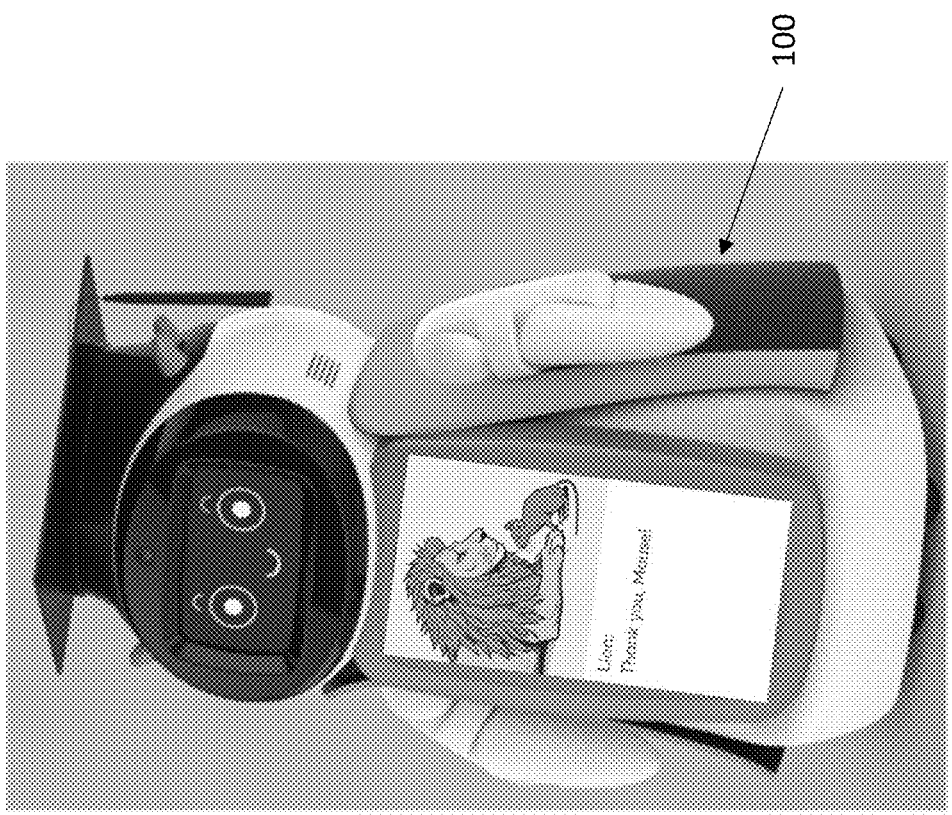
FIG. 2 illustrates the language coaching apparatus of FIG. 1 with two separate outfits.
Figure 2:
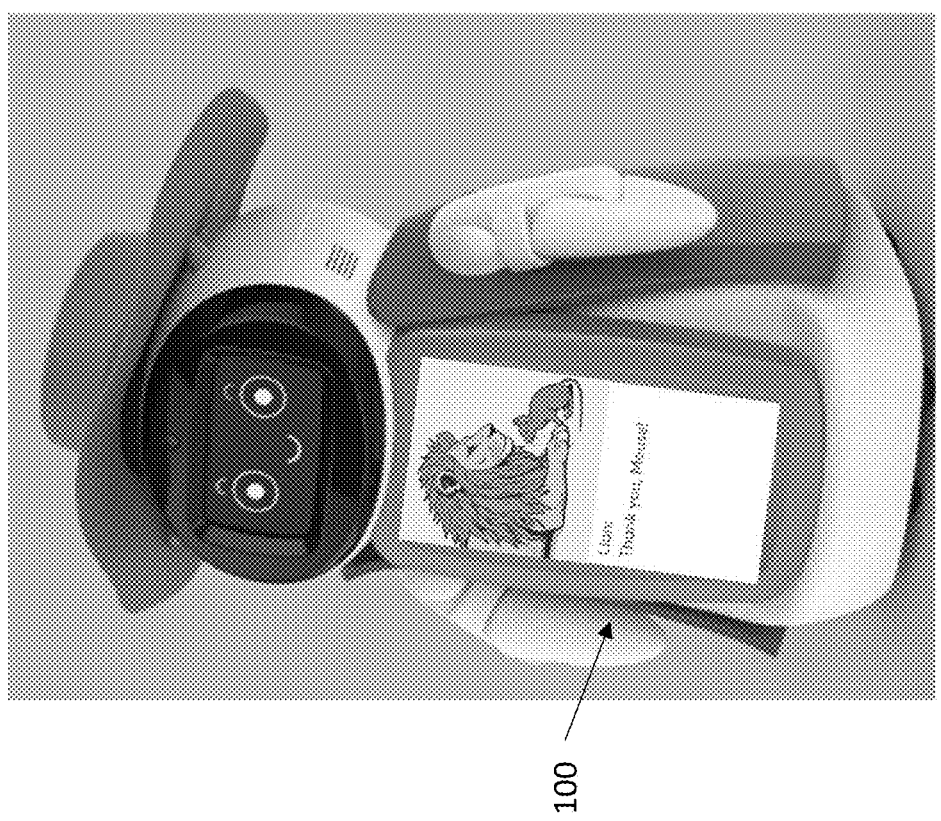

Optionally, as shown in FIG. 2, the coaching apparatus 100 is adapted to support clothes and other accessories. For example, users (e.g., children) can dress up the coaching apparatus in various clothes or outfits. For example, soft textured clothing can be worn i.e., placed on the apparatus 100. FIG. 2 illustrates two example outfits. In one image a cowboy hat and vest are worn on the apparatus 100. In the other example, an academic cap is worn on the coaching robot 100 (i.e., coaching apparatus 100).

In the illustrated embodiment at least one of the sensors on the apparatus 100 may also be used to sense audible recitation of one or more words by the user. The language coaching apparatus 100 comprises a microphone 140. The microphone 140 may be positioned on a front face. In the illustrated example, the microphone 140 may be located on the head 130 of the coaching robot 100. The microphone 140 is configured to record a user speaking and reading out one or more words that are presented on the user interface 110. The microphone 140 may be an electret microphone or any other suitable microphone. In one example, the coaching apparatus 100 may comprise multiple microphones.

The one or more sensors may further comprise a camera 142. The camera 142 may be disposed on or in the apparatus 100. As shown in FIG. 1, the camera 142 may be positioned on a front face and head 130 of the apparatus 100. The camera 142 is adapted to record a user reading one or more words presented on the user interface 110. The camera 142 is adapted to record the face and facial expressions of the user as the user recites one or more words. The camera 142 may be a digital camera. The camera 142 may be configured to record video. Optionally, the camera 142 may also be configured to capture still images of the user. In one example, the coaching apparatus 100 may comprise multiple cameras.

In the illustrated embodiment the user interface 110 comprises a first screen 112 and a second screen 114. The second screen 114 is larger than the first screen 112. The first screen 112 is located above and spaced away from the second screen 114. The first screen 112 is configured to present thereon a face. The second screen 114 is configured to present thereon the one or more words for recitation. The first screen 112 may be a face monitor and the second screen 114 may be a body monitor. The coaching apparatus 100 is configured to present one or more facial expressions on the first screen 112, and move the one or more moveable arms 106, 108 to perform one or more gestures.

The language coaching apparatus 100 comprises a speaker 144. Optionally, the coaching apparatus 100 may comprise multiple speakers 144. As shown in FIG. 1, the coaching apparatus comprises a speaker 144 that is disposed on the head 130 of the coaching apparatus 100. In one example, the coaching apparatus 100 may comprise a removable rear cover to allow access to the controller 200 and other electronics for repair and maintenance. The coaching apparatus 200 may further comprise one or more projections 150 disposed on the head 130. The projections 150 may be used to fix hats or clothes on the robot 100. The coaching apparatus 200 may comprise multiple projections disposed on the head or the body or the combination of head and body.

Figure 3:
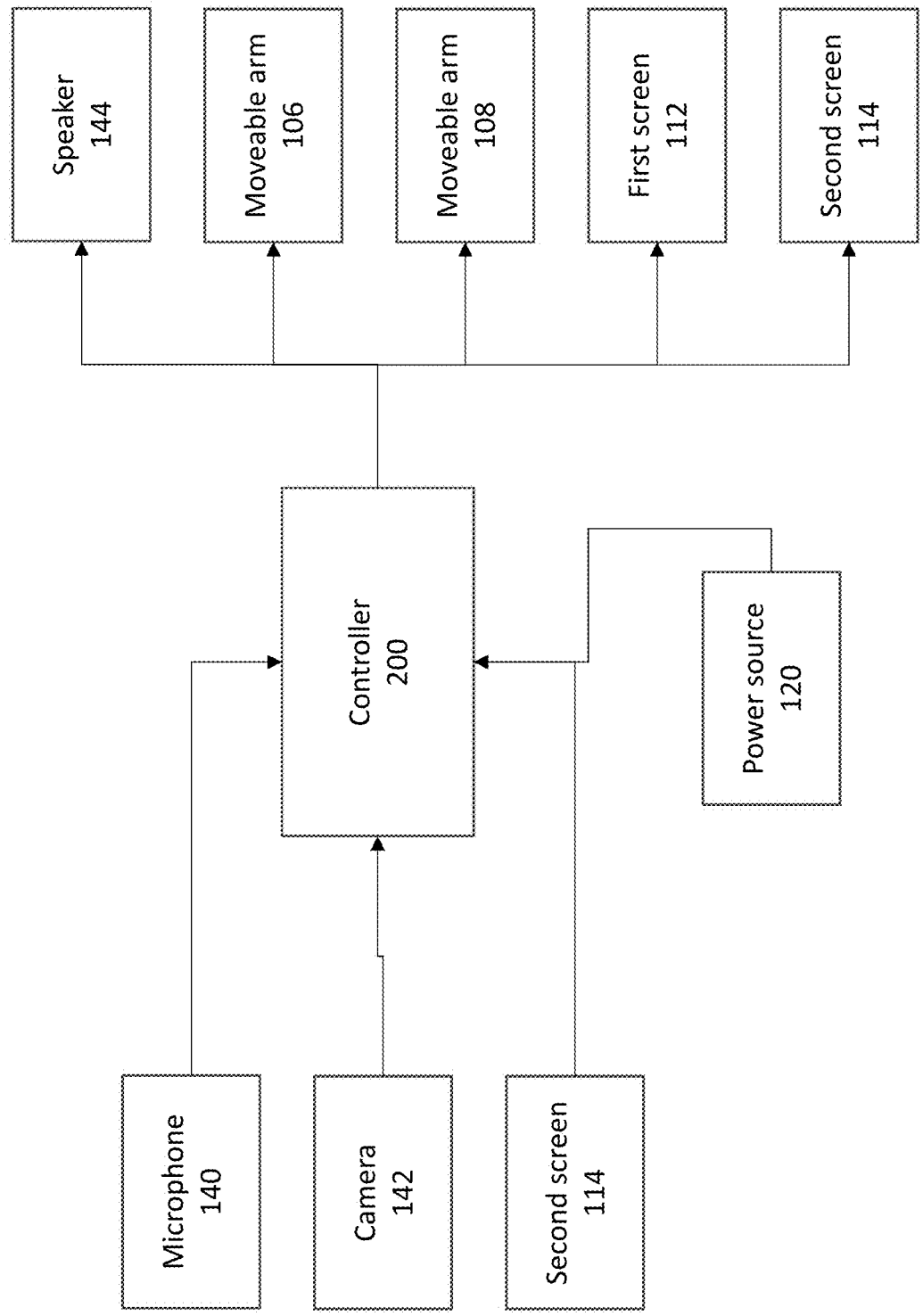
FIG. 3 illustrates a control diagram of the language coaching apparatus.

Referring to FIG. 3, a control diagram of the language coaching apparatus 100 is displayed. As shown in FIG. 3, the controller 200 is operatively coupled to the first screen 112, second screen 114, the camera 142, microphone 140, speaker 144 and the one or more moveable arms 106, 108. The camera 142 and microphone 140 may be considered as sensors. The controller 200 is configured to receive signals from the microphone 140, and recorded video or images from the camera 142. The controller 200 may also receive inputs e.g., commands etc. via the user interface e.g., via one or both screens 112, 114. The controller 200 is configured to provide actuation signals to the one or more moveable arms 106, 108 to move the arms. The controller 200 may further provide an output signal to the speaker 144 to activate the speaker and orate one or more words.

The first screen 112 and second screen 114 may be any suitable display such as for example a liquid crystal display, a light emitting display or any other suitable display. The first screen 112 and second screen 114 may comprise a touchscreen. The one or more words, e.g., stories or sentences or phrases may be presented on the second screen 114, and the speaker 144 may be controlled to orate (i.e., speak) the one or more words. The controller 200 may be configured to control the first screen 112 to display facial expressions that indicate an emotion. The specific emotions displayed may be co-ordinated with the specific words displayed on the second screen 114, to provide an improved sensory experience and teach a user (e.g., a child) the correct expressions when reading the displayed words. The arms 106, 108 may be actuated by the controller 200 to perform gestures that may be coordinated with the words. The controller 200 is configured to coordinate the operation and actuation of the speaker 144, first screen 112, and arms 106, 108 with the words displayed on the second screen 114 to provide a multi sensory experience to a user. The multi sensory experience also indicates to the user the correct way the words sound and associated gestures and expressions.

Figure 4:
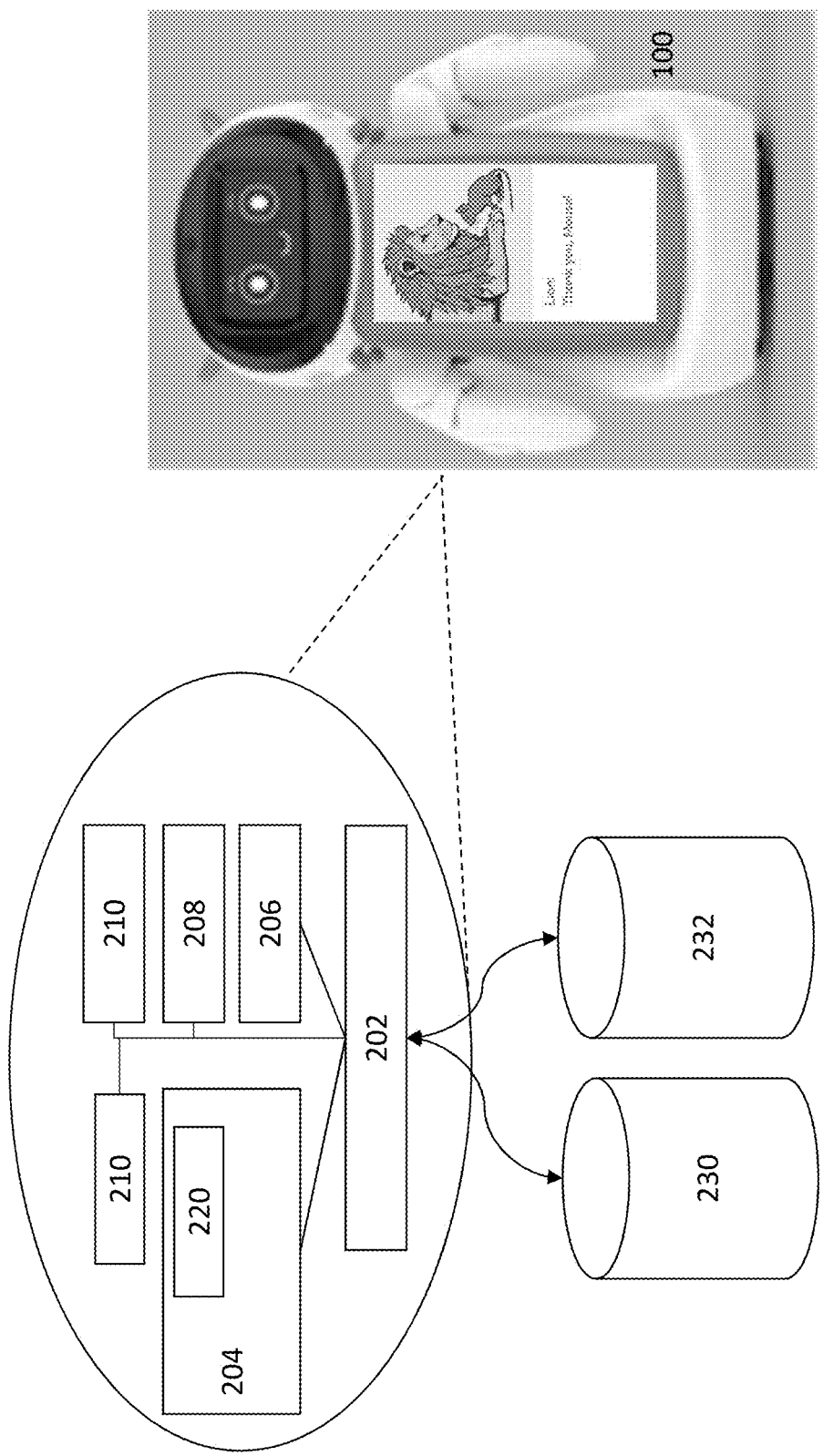
FIG. 4 illustrates a schematic diagram of the language coaching apparatus of FIG. 1.

FIG. 4 illustrates a schematic diagram of an example embodiment of the language coaching apparatus 100, and its components. In this embodiment coaching apparatus 100 includes suitable components necessary to receive, store and execute appropriate computer instructions. The controller 200 may include processing unit 202, including Central Processing Unit (CPU), Math Co-Processing Unit (Math Processor), Graphic Processing Unit (GPUs) or Tensor processing unit (TPUs) for tensor or multi-dimensional array calculations or manipulation operations and a memory unit 204. The memory unit may comprise one or more of a read-only memory (ROM), random access memory (RAM), and or disk drives. As shown in FIG. 4, the coaching apparatus 200 may also include one or more input devices 212 such as an Ethernet port, a USB port, etc.

Optionally, the coaching apparatus 100 may further comprise one or more lights that can be used as indicator lights or may be lit in response to one or more words. The lights may be used to communicate specific pronunciation cues or reading cues to the user.

The coaching apparatus 100 may comprise one or more communication modules. For example, as shown in FIG. 4 the coaching apparatus 100 may comprise a Wi-Fi module 206, a Bluetooth module 208 and a cellular communication module 210 for 4G/5G communication. The communication modules 206-210 may connect to one or more computing devices such as a server, personal computers, terminals, wireless or handheld computing devices, Internet of Things (IoT) devices, smart devices, edge computing devices. The computing apparatus 100 may be operable by a remote control device. A user can use an appropriate remote control to send signals to the apparatus 100.

The controller 200 of the coaching apparatus 100 may provide the necessary computational capabilities to operate or to interface with a machine learning network, such as a neural networks, to provide various functions and outputs. The computing apparatus is configured to implement a scoring model 220. The scoring model 220 may be a neural network or other AI model. The scoring model 220 may be implemented locally, or it may also be accessible or partially accessible via a server or cloud-based service. The scoring model 220 e.g., a machine learning network may also be untrained, partially trained or fully trained, and/or may also be retrained, adapted or updated over time. The controller 200 may be configured to implement a deep convolution neural network, as part of the scoring model 220 that may be used to extract acoustic features from recorded audio of a user.

The scoring model 220 may be configured to evaluate the quality of the recorded audio (i.e., audible recital) by a user. The scoring model 220 may be configured to establish statistical non linear correlation between acoustic features and scoring results to assess quality of the recital. The acoustic features (i.e., phonemes) may be compared with a corpus of correct pronunciations. The scoring model 220 may be configured to compare decomposed phonemes from the audible recitation with reference phonemes. The scoring model 220 generates a score based on the correlation of the decomposed phonemes to the reference phoneme.

The correct pronunciations for words may be defined and stored in the pronunciation database 230. The pronunciation database 230 is arranged to store correct pronunciations. The pronunciation database 230 may store a corpus of correct pronunciations of words, sentences etc. The corpus may define the correct way to say words in a language, e.g., Chinese or English. Alternatively, the corpus may be stored in a memory unit of the apparatus 100. The database 230 may store correct pronunciations in multiple languages.

The corpus may be developed from a large number of users reading words in a language e.g., English or Chinese or another language. A considerable amount of audio clips from varying users may be collected and used as a training set, along with the corresponding text. The user's may cover different regions, ages, genders and skill levels. A plurality of experts are used to grade each audio and each audio may be evaluated a plurality of times e.g., at least three times. A neural network e.g., a deep convolution neural network may be used to extract key features and establish a statistical non linear correlation between acoustic features and the score from experts, to define the corpus. The scoring model 220 may be trained using the corpus and scoring results of the experts so that the scoring model can screen out the acoustic features irrelevant to the scoring results and adjust the correlation parameters to make the scoring model more match the expert scores. The scoring model may be accurate to phoneme level. The score from each expert may be divided into four grades like a percentile system e.g., 0-54, 55-69, 70-84 and 85-100 (wherein all numbers are percentiles). Each score may include three sub scores.

The scoring model 220 may be configured to decompose the recital of words into phonemes. A phoneme is the smallest unit of pronunciation of a language. For example, phonemes may be English phonetic symbols or Chinese vowels. The scoring model 220 may be configured to generate three sub scores. The first sub score corresponds to a score of the pronunciation of each word in the recitation. A second sub score corresponds to a score integrity of recitation. A third sub score corresponds to a score of fluency the recitation. In one example each sub score is between 1 and 4. An overall score may be generated by the scoring model 220, by combining the sub scores or by averaging the sub scores.

The language coaching apparatus 200 may further comprise a story database or words database 232. The story database 232 may store one or more stories that can be presented on the user interface, e.g., the second screen. The database 232 may be stored in a memory unit of the coaching apparatus 100 or may be stored in cloud facility or at a remote server. The stories may be pre-loaded or may be accessed from a remote system e.g., a content management system 300.

Figure 5:
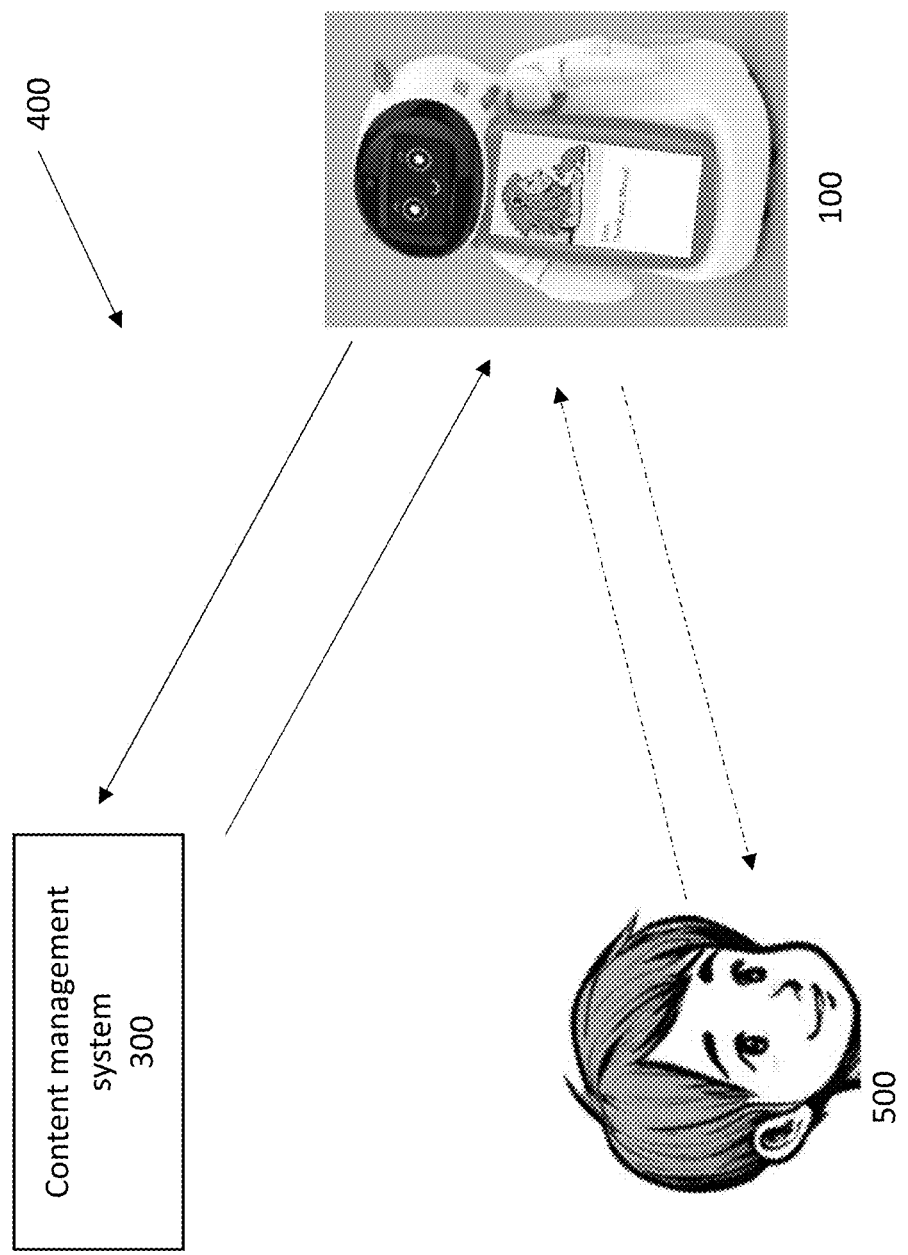
FIG. 5 illustrates an example embodiment of a language coaching system.

FIG. 5 illustrates an example language coaching system 400. The language coaching system 400 comprises the language coaching apparatus 100 and a content management system 300. The content management system 300 may be a central management system. The coaching apparatus 100 is arranged to communicate with the content management system 300. The coaching apparatus 100 may be configured to receive data from and transmit data to the content management system 300. A teacher or educator or other authorised person can register with the content management system 300 via a registration process. Details of the authorised person may be stored appropriately e.g., a authorised persons database (not shown).

The authorised person e.g., a teacher or educator is allowed access to use the content management system 300. A teacher can load one or more words e.g., a story. The story may be stored in the content management system 300. The story (i.e., one or more words) may be transmitted to the coaching apparatus 100. The language coaching apparatus 100 may be configured to display one or more words (e.g., a story) received from the content management system 300 and interact audibly and/or visually with the user 500 to assist with learning a language. The coaching apparatus 100 is configured to measure the performance of the user and provide feedback to the user regarding their pronunciation and performance. As shown in FIG. 5, the coaching apparatus 100 is configured for two way communication with the user 500 as denoted by the two arrows. The language coaching apparatus 100 is configured to present words and/or orate words to a user, and also receive audible recitations by the user, evaluate performance and provide feedback to the user.

In one example the language coaching apparatus 100 is configured to present one or more words of a language on the user interface 110 for audible recitation by a user 500. The words may be presented on the second screen 114. The coaching apparatus 100 is further configured to sense an audible recitation of the one or more words of the language presented on the user interface 110. The apparatus 110 is configured to sense the audible recitation via the microphone 140. The coaching apparatus 100 is configured to evaluate the audible recitation and generate a score of the audible recitation. The score is representative or indicative of the quality of the audible recitation. The coaching apparatus 100 is further configured to provide feedback to the user to improve their audible recitation and/or facilitate learning of the language.

Figure 6:
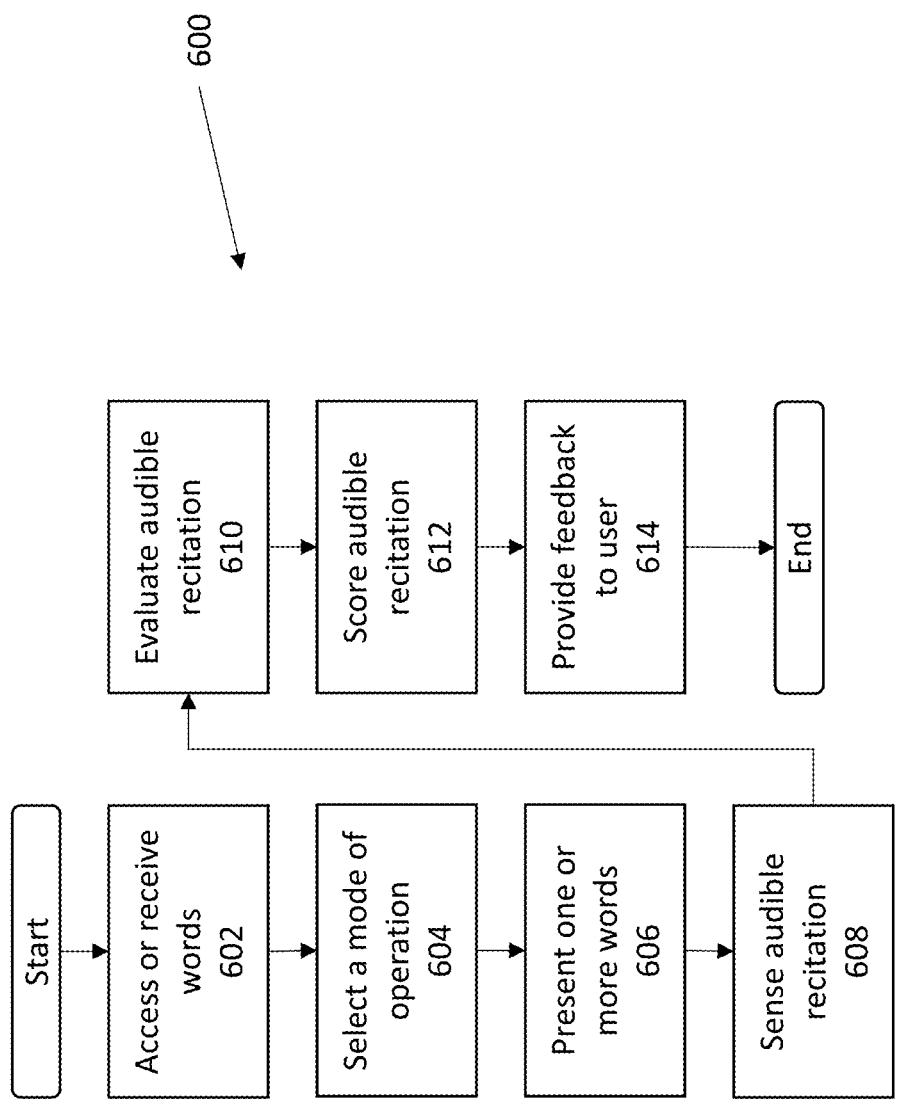
FIG. 6 illustrates an example language coaching method.

FIG. 6 illustrates an example language coaching method 600. The method 600 may be implemented by the language coaching apparatus 200. The method commences at step 602. Step 602 comprises accessing or receiving one or more words. The words may be accessed from a memory or received from the content management system 300. The one or more words may be a phrase, sentence, story or any other suitable collection of words that need to be taught to a user or utilised to assess the speaking ability of the user.

Step 604 comprises selecting a mode of operation. The mode of operation may be listen mode (i.e., assessment mode), co-tell mode or re-tell mode. Preferably the authorised person e.g., a teacher may select the mode of operation. In another example, the coaching apparatus 100 may operate sequentially between an assessment mode, co-tell mode and re-tell mode.

Step 606 comprises presenting the one or more words of a language on the user interface 110. The words may be presented on the second screen. Step 608 comprises sensing an audible recitation of the one or more words of the language presented on the user interface. Step 610 comprises evaluating the audible recitation. Step 612 comprises generating a score of the audible recitation, wherein the score represents the quality of the audible recitation. Step 614 comprises providing feedback to the user to improve their audible recitation and/or facilitate learning of the language.

The feedback may be provided via the user interface 110 e.g., via the second screen 114 or as facial expressions via the first screen 112. The feedback comprises one or more of: suggested improvements a user can make to their audible recitation or a correct pronunciation of the one or more words in the language. The one or more words presented on the user interface may be a phrase, sentence or a story. In one example, the feedback may comprise suggested improvements to one or more of: pronunciation, integrity of the recitation, fluency of the recitation, sentence structure, or an overall quality of the recitation. The feedback that is generated is based on the score of the audible recitation. The apparatus is configured to present more complex words or phrases or sentences as the user's score improves to facilitate learning of the language.

In one example, the language coaching apparatus 100 is configured to interact with the user, wherein the interaction with the user demonstrates one or more social skills. The social skills demonstrated may comprise one or more facial expressions presented on the first screen 112. Optionally, the moveable arms 106, 108 may be configured to perform one or more gestures. The speaker 144 may further be controlled to deliver the correct tone in audible communications. The interactions demonstrate social skills teach a user how to use social skills.

Figure 7:
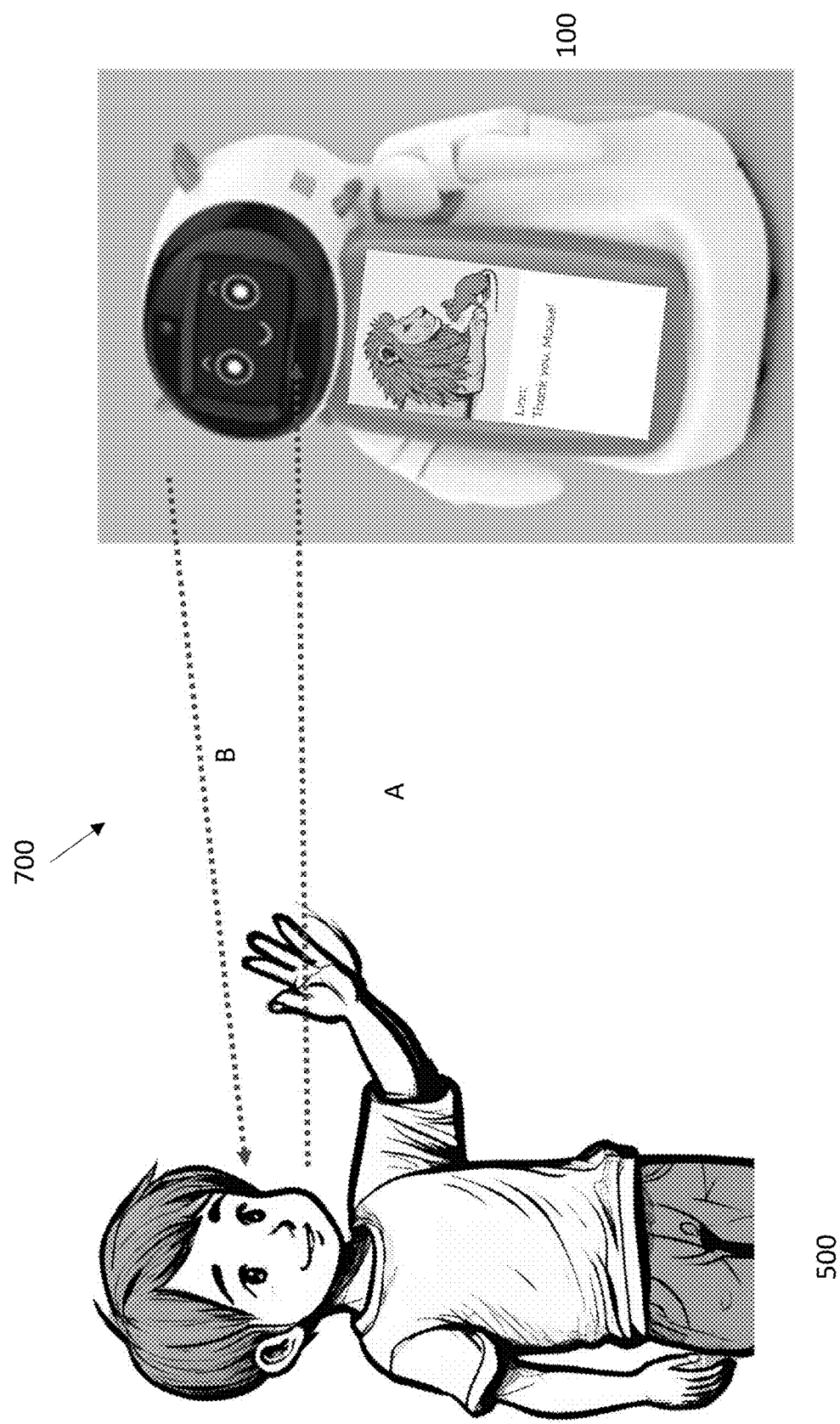
FIG. 7 illustrates an example of an assessment mode and listen mode.

The language coaching apparatus 100 is configured to operate in one or a listen mode (i.e., assessment mode), co-tell mode and/or re-tell mode. FIG. 7 illustrates an example of an assessment mode. The language coaching apparatus 100 is configured to initially assess the performance of the user.

FIG. 7 illustrates one example of the coaching apparatus 100 operating in a listen mode 700. In In listen the coaching apparatus 100 is configured present one or more words (e.g., a story) on the second screen 114. The user is prompted to read out the presented words. The coaching apparatus 100 detects the audible recitation via the microphone, as represented by arrow A. The audible recitation may also be captured via the camera 142. The controller 200 may be configured to process the recorded video to extract sounds. In one example, the scoring model may be trained to process recorded audio. However, the scoring model, may also be configured to process recorded video to extract audio and decompose phonemes etc.

The coaching apparatus 100 may optionally also detect gestures performed by a user. The coaching apparatus 100 is configured to evaluate the recitation by the user and provide a score. The coaching apparatus 100 is configured to apply a scoring model to score the audible recitation. The overall score and/or the sub scores may be displayed on the user interface. Optionally, the score and/or sub scores may also be transmitted to the content management system 300 for access by an authorized party e.g., a teacher.

The coaching apparatus 100 may further interact with the user by displaying emotions as the user recites the words. The coaching apparatus 100 may generate and display one or more facial expressions on the first screen 112. The types of expressions may provide feedback e.g., provide encouragement, improve engagement and improve communication of the user, as denoted by arrow B. Optionally, one or more expression that discourage specific behaviours may be displayed if an inappropriate word is detected or if a user is performing inappropriate gestures.

The coaching apparatus 100 may be configured to provide feedback to a user after the audible recital, to improve their audible recitation and/or facilitate learning of the language. The feedback is provided via the user interface 110, and the feedback may comprise audible and/or visual feedback. The feedback may comprise one or more of: suggested improvements a user can make to their audible recitation or a correct pronunciation of the one or more words in the language. The feedback may comprise suggested improvements to one or more of: pronunciation, integrity of the recitation, fluency of the recitation, sentence structure, or an overall quality of the recitation. The feedback is generated based on the score of the audible recitation and wherein the apparatus is config-ured to present more complex words or phrases or sentences as the user's score improves to facilitate learning of the language.

The coaching apparatus 100 may present progressively more complex words and phrases and sentences, based on the score. As the user's score improves, the user may be presented with more complex stories to read. Optionally, the coaching apparatus 100 may make an assessment a user requires additional support based on the score. If the score is less than a threshold, may be indicative of the requirement of additional support. The coaching apparatus may recommend the user utilise the co-tell mode to learn more or improve their language skills. The listen mode may be performed one on one with a single user, or may be performed in a group. The coaching apparatus 100 is configured to ask each user (e.g., child) in the group to speak at a time.

Figure 8:
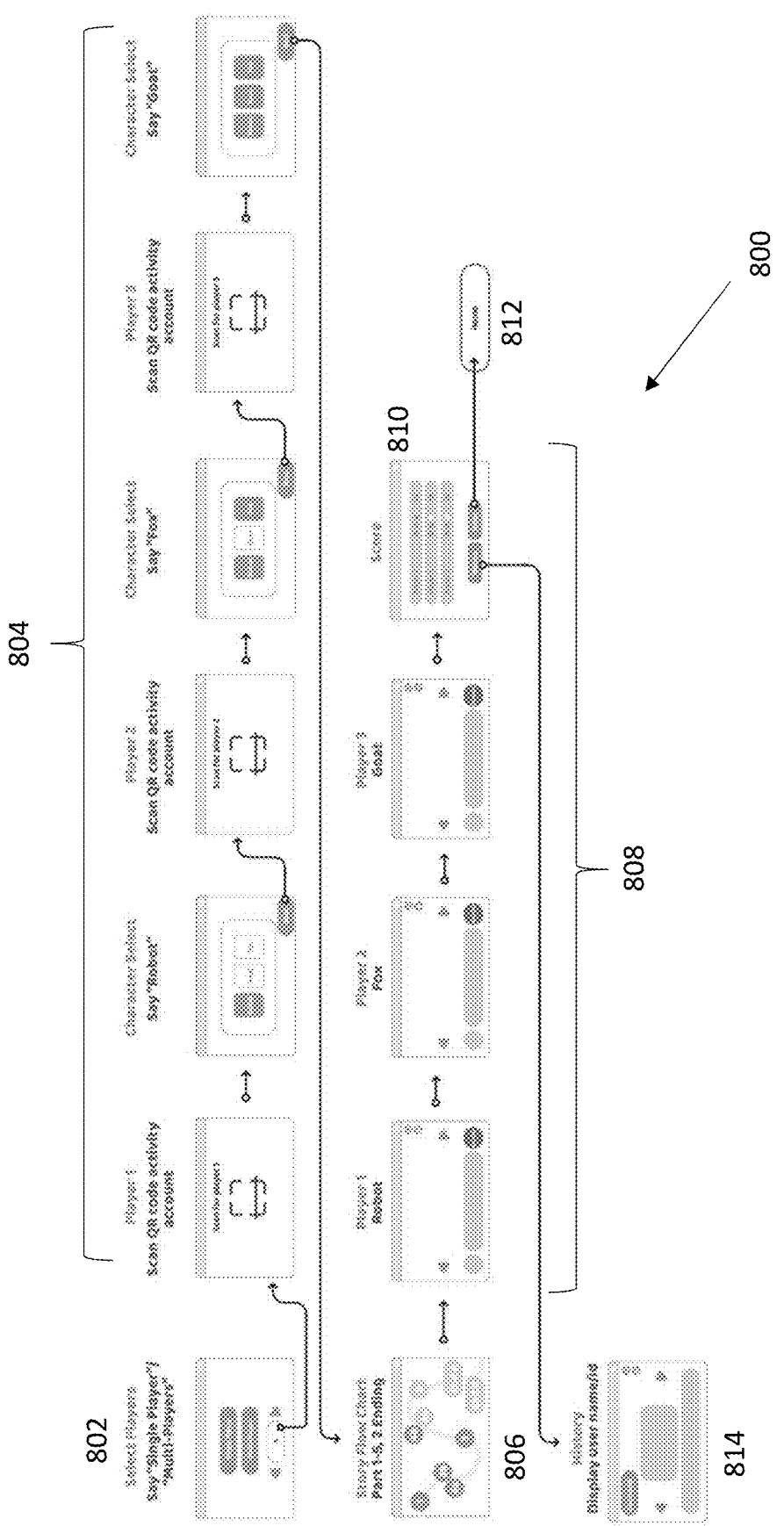
FIG. 8 illustrates an example of the flow during co-tell mode.

FIG. 8 illustrates the process flow of an example co-tell mode 800. As shown in FIG. 8, the coaching apparatus 100 can interact with the user and assist the user in speaking. In co-tell mode a user and the coaching apparatus 100 may co-create a story e.g., by performing role play. During co-tell mode, the coaching apparatus 100 is configured to sound out the presented words with the user. The coaching apparatus 100 may also present one or more facial expressions that correspond to the emotions of the words or story to illustrate to the user the appropriate expressions. Optionally, the controller 200 may be configured to control the arms 106, 108 to perform appropriate gestures.

Figure 11:
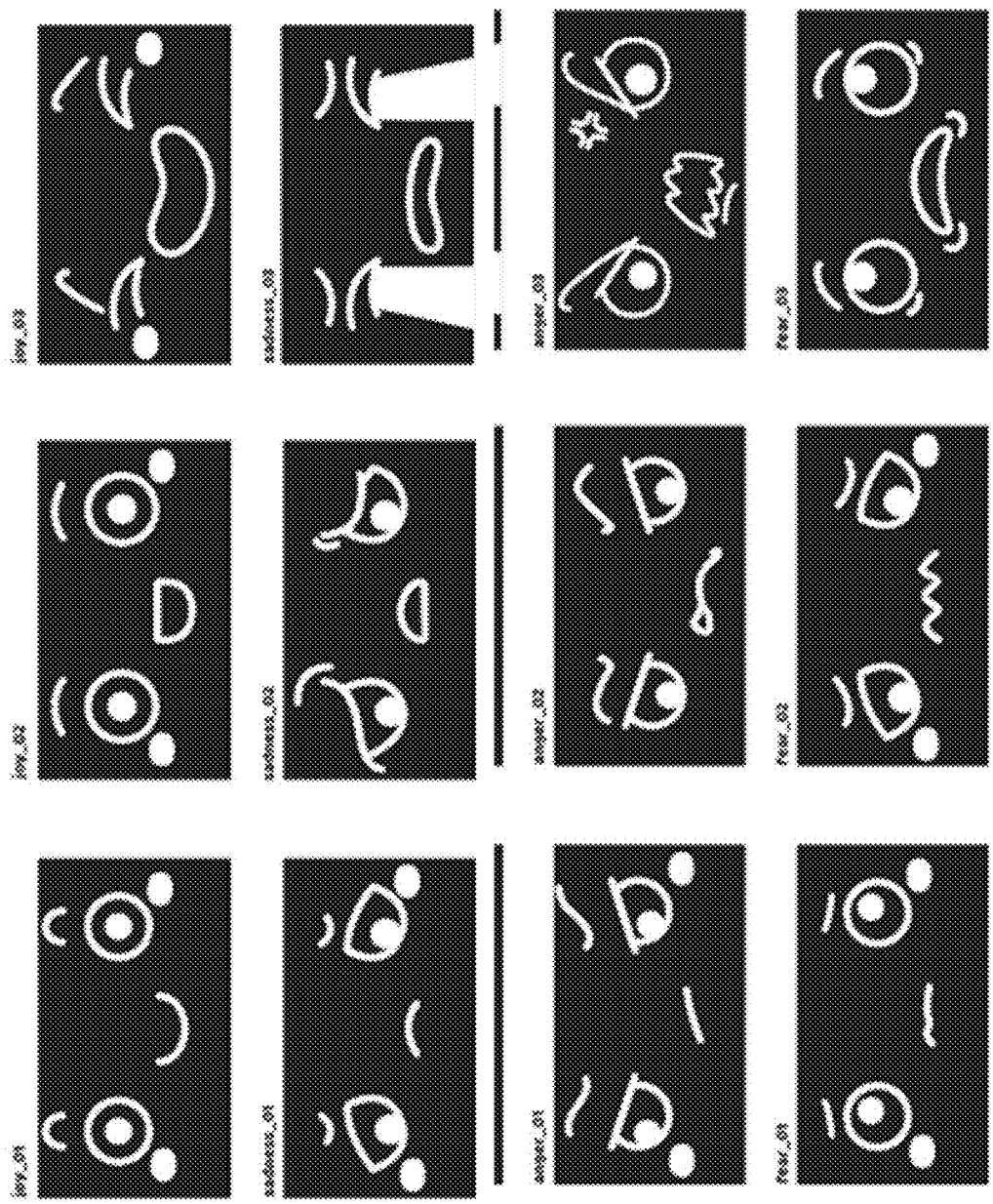
FIG. 11 illustrates various facial expressions that can be presented on the coaching apparatus user interface.
Figure 12:
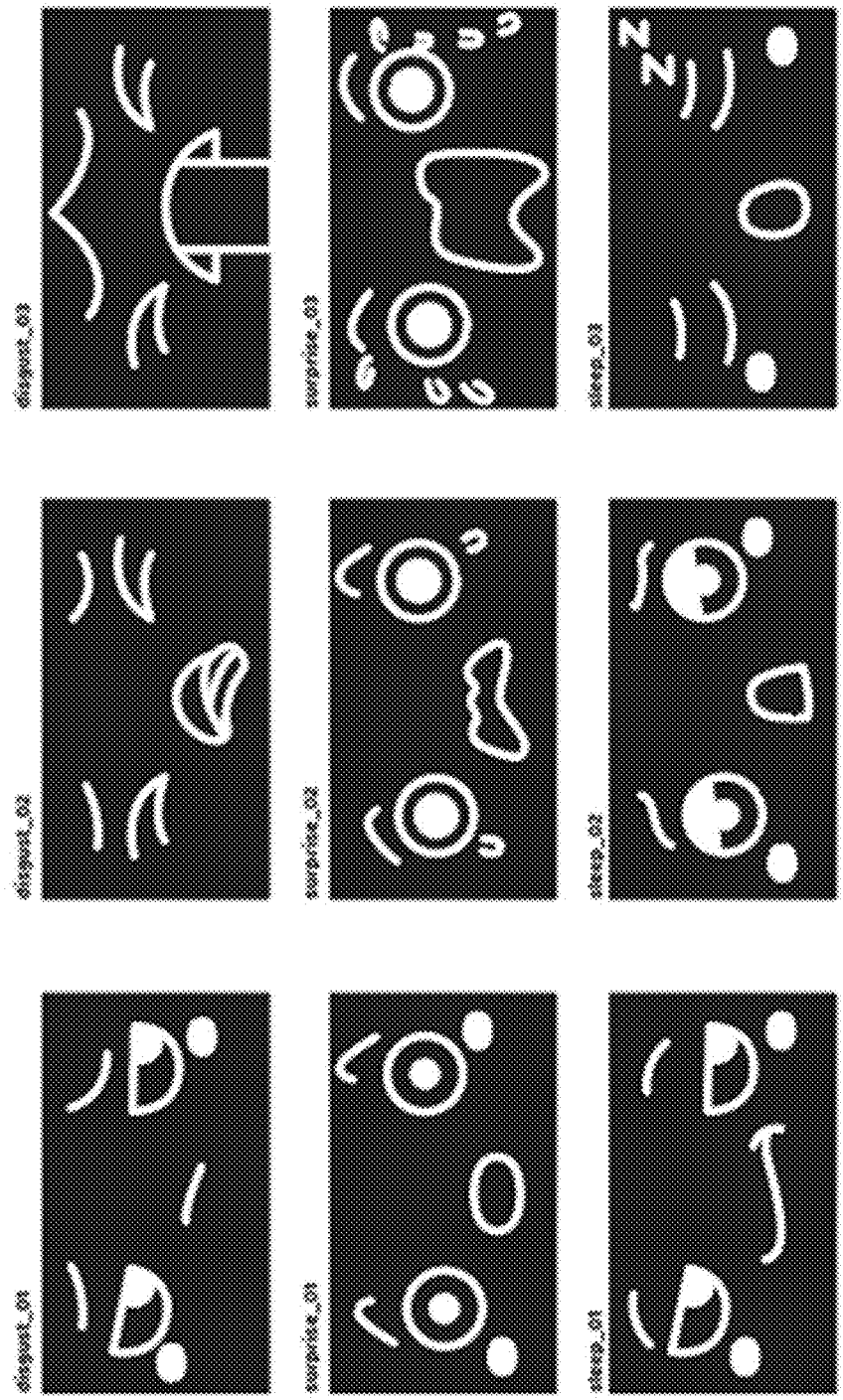
FIG. 12 illustrates various facial expressions that can be presented on the coaching apparatus user interface.

FIGS. 11 and 12 provide examples of the various facial expressions that may be presented on the first screen 112 of the coaching apparatus. The controller 200 may be programmed to generate and present an appropriate facial expression. As seen in FIGS. 11 and 12, the coaching apparatus 100 is capable of presenting at least twenty-one different expressions.

Any one of the modes e.g., listen mode, co-tell mode or re-tell mode may be gamified. FIG. 8 illustrates an example game that may be played as part of co-tell mode. At step 802, players may be selected. Step 804 comprises a calibration process for each player. As shown in FIG. 8, players 1, player 2 and player 3 each scan a QR code or other suitable code. The QR code may be encoded with each player's proficiency rating or a score from the previous listen mode. Each player is requested to speak a specific word. For example, as shown in FIG. 8 player 1 is requested to say "Robot", player 2 is requested to speak "Fox" etc. The specific word may be an identifier associated with each player.

At Step 806 a story flow chart is presented. The story flow chart comprises a plurality of parts of a story. The story is separated into specific elements. Each element may comprise a plurality of words e.g., in a phrase or a sentence. The flow chart visually illustrates the sequence of the story and the specific parts e.g., 1, 2a, 2b etc.

At step 808 each player is asked to read out each part of the story. The coaching apparatus 100 is configured to audibly read out each part of the story, as the user audibly recites the specific part of the story. The words of each specific part are presented on the second screen 114 for each player to recite. The audible recitation is evaluated and scored by the computing apparatus 100. Step 810 comprises displaying the score of each player. The score of each player may be displayed on the user interface 110 or may be transmitted to the content management system 300. An option to return to the "Home" i.e., back to the start may be presented to restart co-tell mode, at step 812. A history of each player's performance may also be displayed, at step 814. Steps 812, and 814 may be optional. The score history may be accessible by a teacher or other authorised person.

Figure 9:
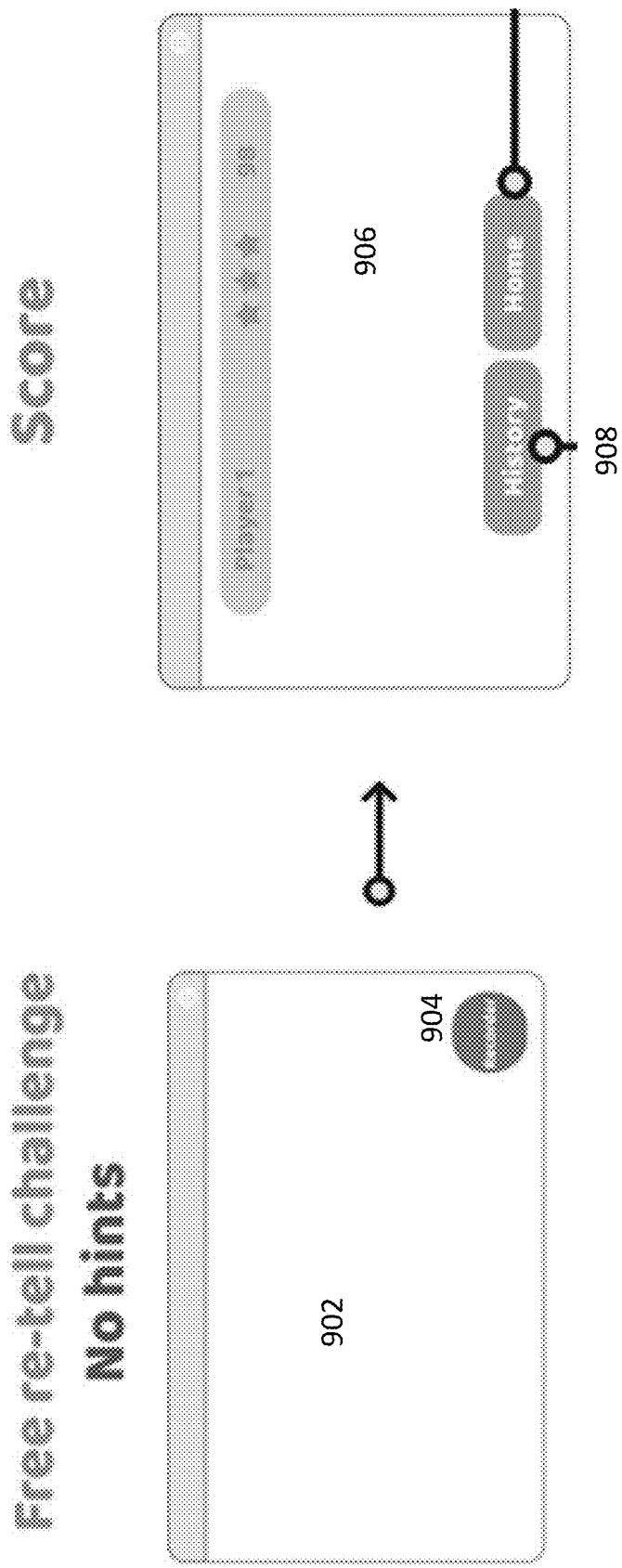
FIG. 9 illustrates example screens during re-tell mode.

FIG. 9 illustrates an example of a Re-tell mode. In re-tell mode a user may be presented with a story or other words and asked to recite the words. As shown in FIG. 9, a story screen 902 is presented. In the example of FIG. 9, no hints are presented or provided to the user. A user is prompted to recite the presented story e.g., by pressing the record button 904. The coaching apparatus 100 is configured to record the audible recitation, evaluate the audible recitation and calculate a score. The score may be presented on a score screen 906. User's scores through multiple sessions may be stored and accessible via the history button 908.

Figure 10:
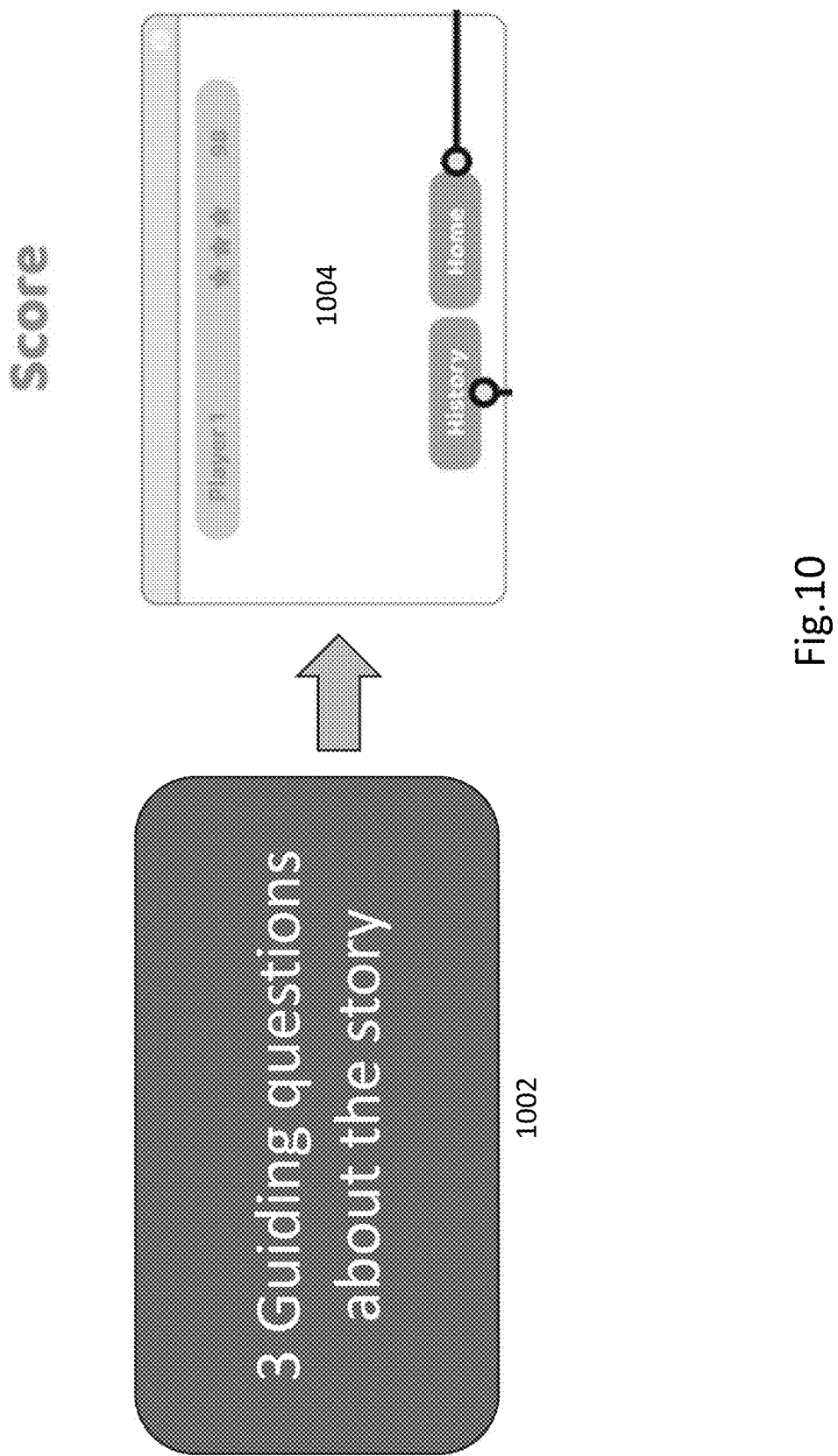
FIG. 10 illustrates further screens during re-tell mode.

FIG. 10 illustrates another example of Re-tell mode: Referring to FIG. 10, after an initial Re-tell mode with no hints, one or more guiding questions may be presented on the user interface 110. The one or more guiding questions may be generated in the controller 200 of the coaching apparatus 100. The guiding questions assist a user in reciting and pronouncing the words in the story. As shown in the example of FIG. 10, three guiding questions 1002 are presented on the user interface 110. The guiding questions may be prompts about the story or may be other hints to assist the user. The user is prompted to recite the presented story. The coaching apparatus 100 is configured to record the audible recitation, apply a scoring mode, generate a score and present the score on a screen 1004.

The coaching apparatus 100 is configured to track the score of a user to track performance over time. The various modes may provide a road map style approach to encourage users e.g., students or children to complete the whole program. The score of the user at each stage is recorded. Once a child can adequately recite a presented story in co-tell mode, a re-tell mode may be presented. Once the child can score high enough in the re-tell mode, the coaching apparatus 100 may go back to listen mode to score the child reciting the story unassisted. Alternatively, the apparatus 100 may activate a listen mode with a more challenging story or collection of words for the user. In this manner, the user can complete each mode multiple times to improve their spoken ability of a language and learn a language.

The coaching apparatus 100 is configured to assign different levels of stories to users according to their score in an initial assessment mode, and then based on the score in subsequent listen modes. Stories may be categorised based on difficulty level. In one example, stories may be categorised into four levels in terms of complexity.

Figure 13:
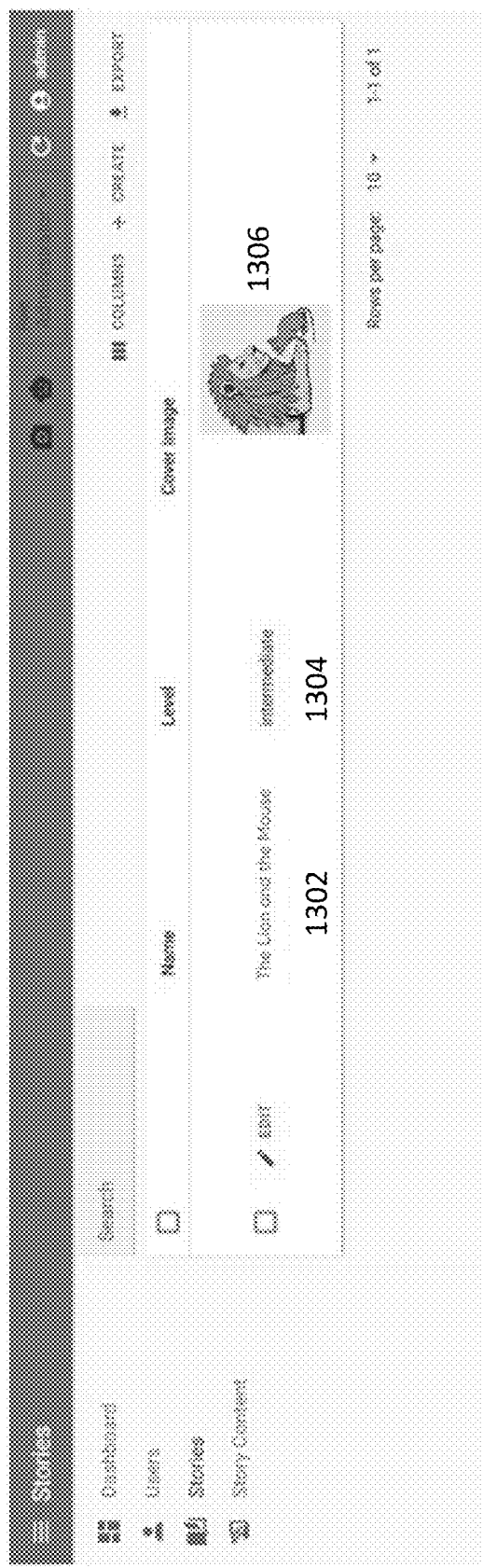
FIG. 13 illustrates an example story creation screen of the content management system.

FIG. 13 illustrates an example story creation screen 1300 of the content management system 300. The screen indicates the title 1302 of the story, a difficulty level 1304 and a cover image 1306. An authorised person e.g., a teacher can edit the story or add a new story or create a new story. The screen 1300 also provides other options to manage various options e.g., view the users or other stories etc.

Figure 14:
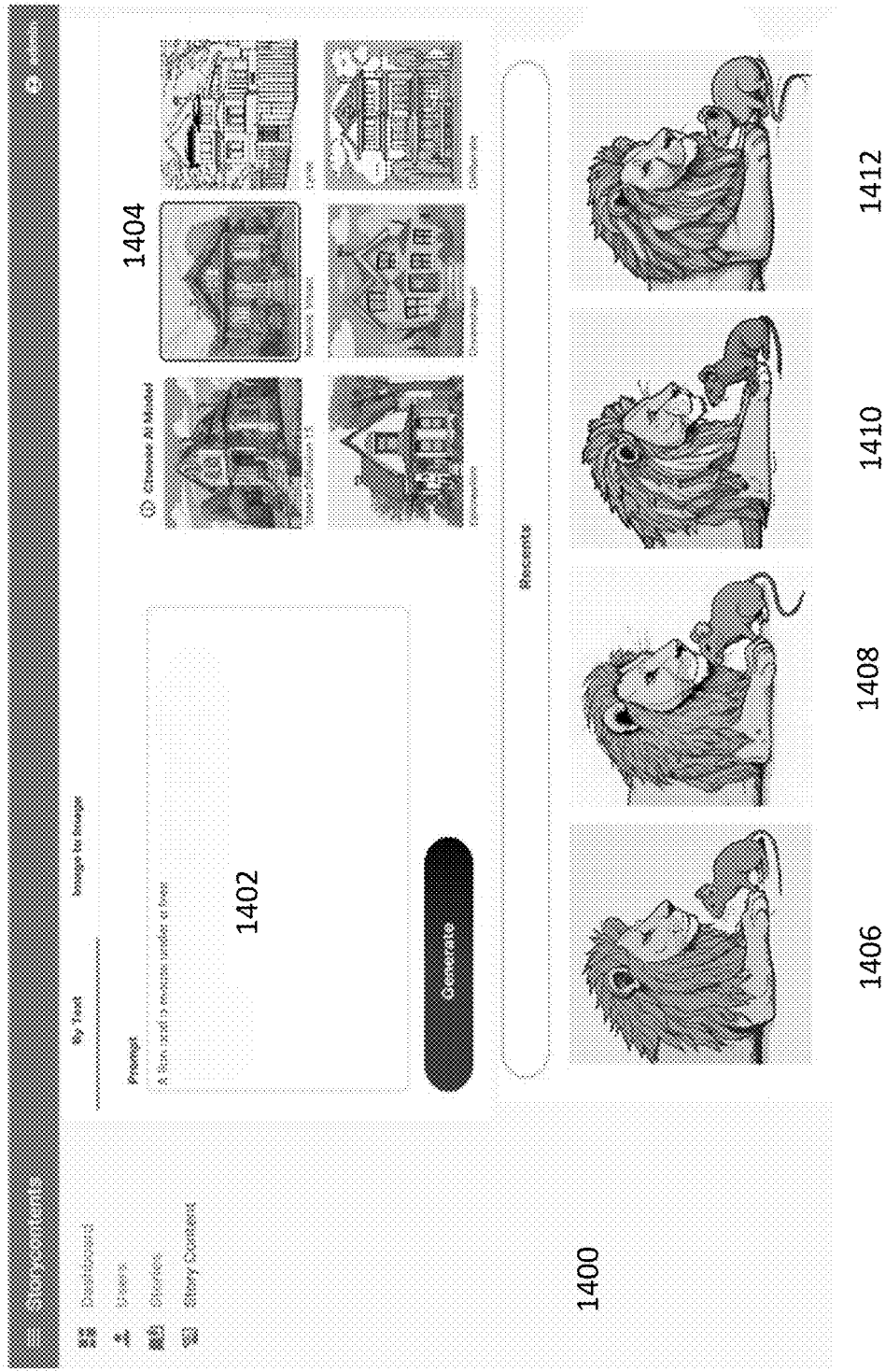
FIG. 14 illustrates an AI image generation screen of the content management system.

FIG. 14 illustrates an AI image generation screen 1400. The content management system 300 may include an AI model that is trained to generate one or more images based on the words of the story. The words may act as prompts to the AI model. The AI model may an open source generative AI model or other suitable model. The AI model, may be unique, proprietary model. As shown in FIG. 14, the prompt input 1402 includes the sentences of the story. An AI model selection screen 1404 is presented with a number of selectable options. A teacher (or authorised user) may select an appropriate AI model. Once the generate button is selected, the AI model may output one or more images that correspond to the sentence. As shown in FIG. 14, the corresponding image 1406 is generated. Other image options 1408, 1410, 1412, corresponding to the story may also be presented for selection. Alternatively, other image panes may correspond to other sentences showing the progression of the story.

Figure 15:
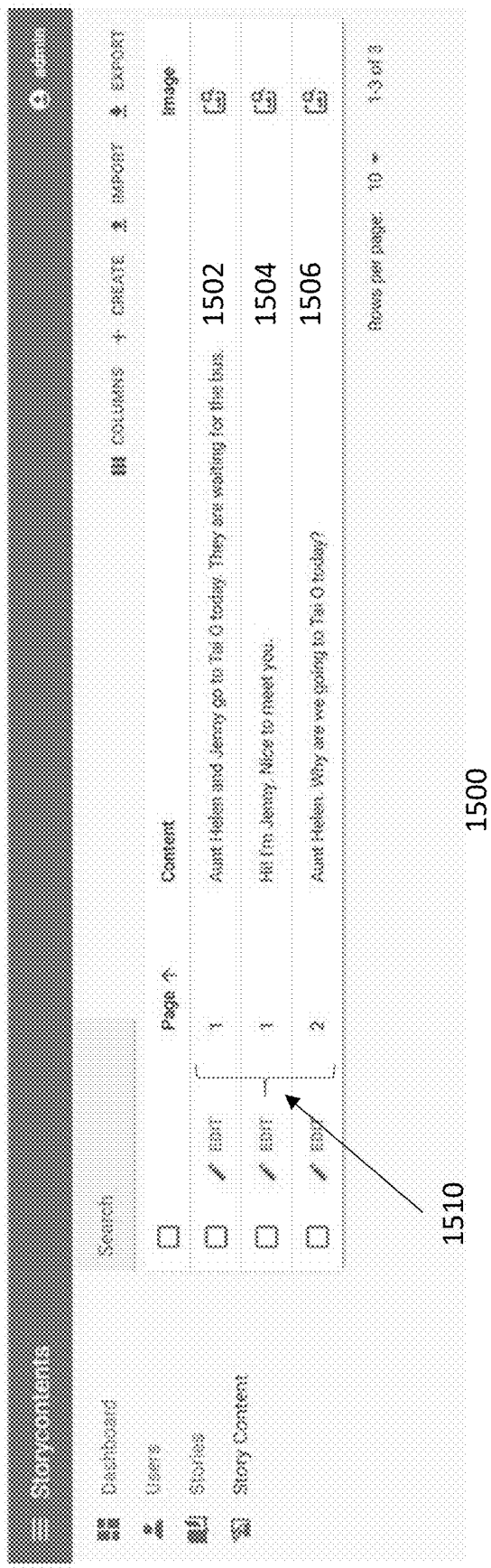
FIG. 15 illustrates an example question screen of the content management system.

FIG. 15 illustrates an example question screen 1500. IN the question screen, a teacher can import questions related to the story into the system. A shown in FIG. 3, three questions 1502, 1504 and 1506 are imported. These questions are editable. Each question may include an associated image, as shown in FIG. 15. A teacher may also define the answer to each question e.g., multiple choice or short answer or long answer etc. Each question may also include an associated page 1510 in the story. The questions may be presented during re-tell mode to guide the user.

The coaching apparatus 100 may also be configured to detect emotions of the user 500. For example, the coaching apparatus 100 may include a facial recognition model that may be implemented by the controller 200. The apparatus 100 may be configured to apply the facial recognition model to identify emotions of the user while the user is reciting the words (e.g., story). For example, the coaching apparatus 100 may detect if a child is bored or enthusiastic or happy etc. The emotions may be identified in the recorded video of the recitation. The recorded emotions may be used to determine how the child is performing and how engage the child is. The emotions can identify additional support that may be required. The controller 200 may be configured to control the first screen 112 to present appropriate digital expressions to assist the user or improve the user's mood etc.

At least an embodiment of the invention has the advantage that the apparatus can be used as a coaching tool for teaching a language to users. The language coaching apparatus capable of interacting with users in a multi sensory manner while reciting one or more words (e.g., phrases or sentences or a story), and the apparatus further can prompt or assist a user while the user is reading out one or more words presented on a user interface of the apparatus. The apparatus is also advantageous because it provides a score and feedback to a user on how to improve.

The coaching apparatus helps to enhance a user's (e.g., a child's) speaking and listening competencies in a language e.g., English through interactive story telling i.e., interactively reciting one or more words. The language coaching apparatus 100 is configured to tell stories in an interactive and multi sensory manner. The apparatus is configured to recite stories audibly while presenting emotions and facial expressions and gestures are required to provide a multi sensory experience to a user. The facial expressions; audible tones and gestures help a user e.g., a child to understand body language.

The language coaching apparatus is advantageous as it can assist user's e.g., children that have developmental or mental disabilities such as for example autism. The coaching apparatus 100 can present multiple facial expressions and social cues to assist autistic users or users with other similar conditions to learn a language and expressions and/or gestures. This can improve the depth of learning, as a user may gain the correct audible pronunciation but also additional body language context providing for improved learning and a more holistic learning.

The language coaching apparatus is also advantageous because it provides scaffolding in storey retelling based on children's responses. The apparatus is configured to support a child as they are retelling a story. The apparatus is configured to provide audible prompts, visual prompts e.g., facial expressions on the screen, or other visible prompts on the second screen to help a child.

The language coaching apparatus is advantageous because it addresses the psychological and social need of users e.g., children when interacting with them, which can facilitate the learning process. The language coaching apparatus 100 is configured to recognise the emotions of users and provides feedback to them accordingly. For example, the emotions can be detected from a recorded video and the apparatus can determine the appropriate audible and/or visual feedback. The coaching apparatus 100 can provide a structured program a child or student can step through to learn a language.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

Any reference to prior art contained herein is not to be taken as an admission that the information is common general knowledge, unless otherwise indicated.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

One or more of the components and functions illustrated the figures may be rearranged and/or combined into a single component or embodied in several components without departing from the scope of the invention. Additional elements or components may also be added without departing from the scope of the invention. Additionally, the features described herein may be implemented in software, hardware, and/or combination thereof.

The invention claimed is:

1. A language coaching apparatus comprising:
a chassis, one or more moveable arms and a speaker,
one or more sensors disposed on or within the chassis, wherein the one or more sensors are configured to record an audible recitation by a user, wherein the one or more sensors includes a camera, wherein the camera is configured to record gestures and/or facial expressions of the user while performing the audible recitation, and a microphone, wherein the microphone is configured to record the audible recitation by the user,
a user interface disposed on the chassis, wherein the user interface is configured to present one or more words on the user interface, wherein the user interface includes a first screen and a second screen, wherein the second screen is larger than the first screen and the first screen is located above and spaced away from the second screen, the first screen configured to present thereon a face, and the second screen configured to present thereon the one or more words for recitation, and a controller operatively coupled to the first screen, second screen, the camera, microphone, speaker and the one or more moveable arms, wherein the language coaching apparatus is configured to present one or more facial expressions on the first screen, and move the one or more moveable arms to perform one or more gestures;
wherein the language coaching apparatus is configured to interact audibly and/or visually with the user to assist with learning a language;
wherein the language coaching apparatus is configured to:
present one or more words of a language on the user interface for audible recitation by a user,
sense an audible recitation of the one or more words of the language presented on the user interface,
evaluate the audible recitation,
generate a score of the audible recitation, wherein the score represents the quality of the audible recitation, and;
provide feedback to the user to improve their audible recitation and/or facilitate learning of the language, wherein the feedback comprises audible and/or visual feedback and the feedback is provided via the user interface;
wherein the feedback comprises suggested improvements to one or more of: pronunciation, integrity of the recitation, fluency of the recitation, sentence structure, or an overall quality of the recitation, and;
wherein the one or more words presented on the user interface are a phrase, sentence or a story;
wherein the feedback is generated based on the score of the audible recitation and wherein the apparatus is configured to present more complex words or phrases or sentences as the user's score improves to facilitate learning of the language.

2. A language apparatus of claim 1, where in the face presented on the first screen is a digital face including at least a mouth of two eyes, the controller is configured to control the face on the first screen to illustrate one or more facial expression, and; wherein the facial expressions correspond to one or more human emotions.

3. A language coaching apparatus of claim 2, wherein the facial expressions displayed on the first screen correspond to the feedback.

4. A language coaching apparatus of claim 3, wherein the language coaching apparatus is configured to:
interact with the user, wherein interaction with the user demonstrates one or more social skills,
wherein the social skills demonstrated comprise one or more facial expressions presented on the first screen, gestures made by the one or more arms and tone in audible communications via the speaker, and;
wherein the interactions demonstrating social skills teach a user how to use social skills.

5. A language coaching apparatus of claim 2, wherein the language coaching apparatus is configured to:
receive a story or access a prestored story,
recite the story in a multi sensory manner using facial expressions, gestures and/or audible tone to teach a user how to recite the story.

6. A language coaching apparatus of claim 2, is configured to operate in co-tell mode, wherein in co-tell mode the language coaching apparatus is configured to audibly recite the one or more words in conjunction with a user to teach the user how to recite the one or more words in the language.

7. A language coaching apparatus of claim 6, is configured to operate in listen mode, wherein, during listen mode, the language coaching apparatus is configured to perform the steps of:
presenting one or more words of a language on the user interface for audible recitation by a user,
sensing an audible recitation of the one or more words of the language presented on the user interface,
evaluating the audible recitation,
generating a score of the audible recitation, wherein the score represents the quality of the audible recitation, and
providing feedback to the user to improve their audible recitation and/or facilitate learning of the language.

8. A language coaching apparatus of claim 6, is configured to operate in a re-tell mode, wherein in re-tell mode the language coaching apparatus is configured to:
prompt a user to recite the presented one or more words,
provide hints or guiding questions to assist the user in reciting the one or more words correctly,
provide an audible recitation of the correct recitation of the one or more words.

9. A language coaching apparatus of claim 8, wherein the language coaching apparatus is configured to:
determine a user's needs based on the score of the user,
adjust the linguistic requirements or linguistic features of the one or more words based on the user's needs.

10. A language coaching apparatus of claim 9, is configured to:
operate in a listen mode first,
operate in one of co-tell mode or re-tell mode or, operate in co-tell mode and then operate in re-tell mode,
evaluate the audible recitation in each mode,
score the audible evaluation in each mode.

11. A language coaching apparatus of claim 10, is configured to apply a scoring model to score the audible recitation, wherein the scoring model is configured to score the quality the audible recitation by comparing the audible recitation with a reference recitation.

12. A language coaching apparatus of claim 11, wherein the scoring model is configured to:
decompose the audible recitation into phonemes,
compare the decomposed phonemes from the audible recitation with reference phonemes,
generate a score based on the correlation of the decomposed phonemes to the reference phonemes.

13. A language coaching apparatus of claim 12, wherein the apparatus is configured to:
generate three sub scores,
wherein the first sub score corresponds to a score of pronunciation of each word in the recitation,
wherein a second sub score corresponds to a score integrity of recitation,
wherein a third sub score corresponds to a score of fluency the recitation,
each sub score is between 1 and 4.

14. A language coaching apparatus of claim 13, wherein the score is an overall score, and the apparatus is configured to generate the overall score based on combining or summing the sub scores.

15. A language coaching apparatus of claim 14, wherein the apparatus is configured to:
receive a story from a remote system,
display the received story on the second screen,
generate one or more images based on the words in the received story,
display the images on the second screen during co-tell mode and re-tell mode as prompts for the user.

* * * * *